E. W. REIBER.
SPOTLIGHT CONSTRUCTION.
APPLICATION FILED MAR. 11, 1920.
1,396,234.
Patented Nov. 8, 1921.
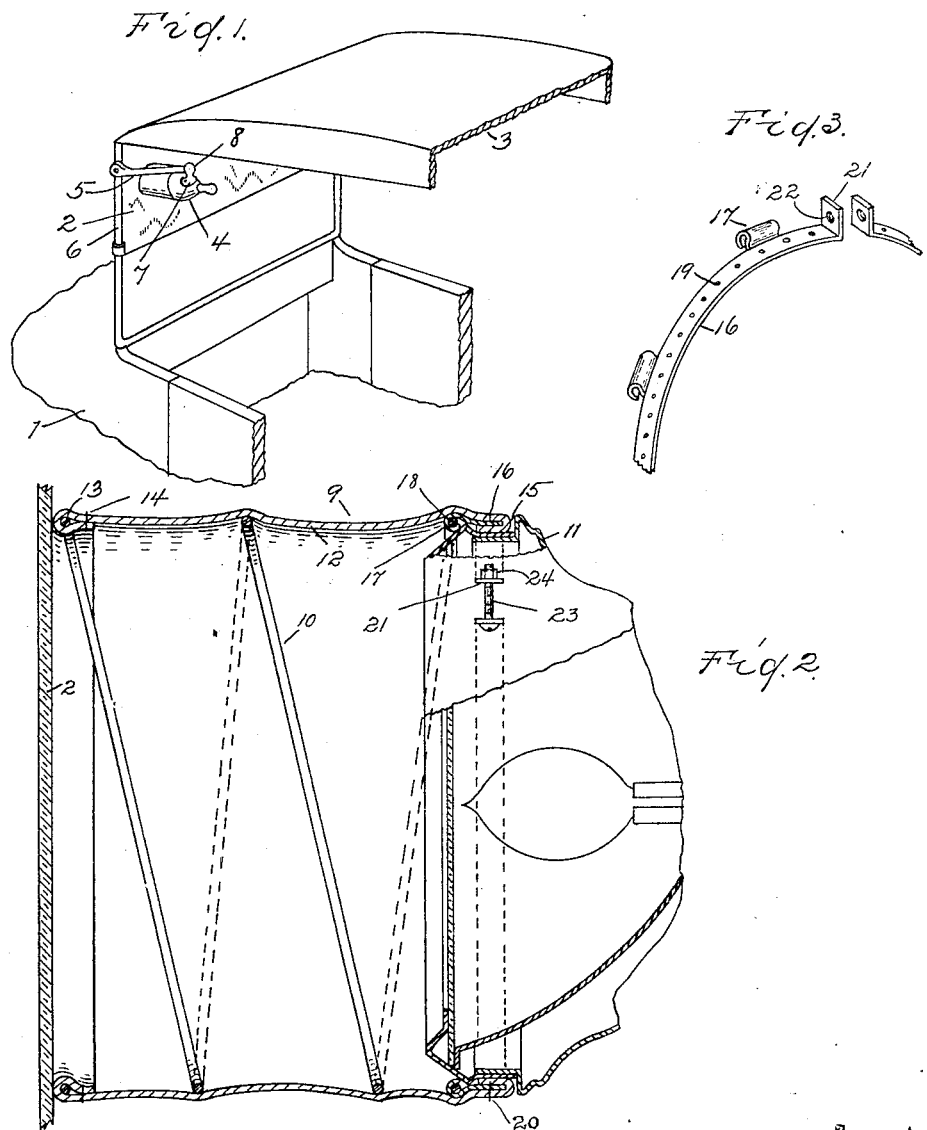
Inventor
Edward W. Reiber
By Whittemore Hulbert + Whittemore
Attorneys

UNITED STATES PATENT OFFICE.

EDWARD W. REIBER, OF ADRIAN, MICHIGAN.

SPOTLIGHT CONSTRUCTION.

1,396,234.   Specification of Letters Patent.   Patented Nov. 8, 1921.

Application filed March 11, 1920. Serial No. 364,921.

*To all whom it may concern:*

Be it known that I, EDWARD W. REIBER, a citizen of the United States of America, residing at Adrian, in the county of Lenawee and State of Michigan, have invented certain new and useful Improvements in Spotlight Constructions, of which the following is a specification, reference being had therein to the accompanying drawings.

The invention relates to lights and is particularly applicable to spot lights arranged in rear of an automobile windshield and adapted to direct its light rays therethrough and upon the road in front of the automobile. The invention has for one of its objects the provision of means for preventing the glare or reflection of the light rays striking the windshield interfering with the vision of the driver or other occupant. Another object is to provide a simple attachment which can be readily secured to any spot light. Further objects of the invention reside in the novel arrangements and combinations of parts as more fully hereinafter set forth.

In the drawings:

Figure 1 is a perspective view of a portion of an automobile with the light embodying my invention attached;

Fig. 2 is a vertical central section through the light;

Fig. 3 is a perspective view of a portion of the securing means.

1 is an automobile, 2 is the windshield and 3 the top. 4 is a spot light in rear of the windshield 2 and secured to the support 5 which is clamped upon the standard 6 at one side of the windshield. The spot light is universally mounted in the support and as specifically shown 7 is a bracket upon the spot light which has a ball engaging in the socket 8 upon the support.

9 is a casing or guard which is adapted to be readily attached to the spot light and extends between the spot light and wind shield and surrounds the rays of light passing from the spot light to the wind shield. This casing comprises the resilient coil 10 which is secured to the forward end of the casing 11 of the spot light and also the covering 12 surrounding the resilient coil and preferably formed of an opaque flexible material such as a heavy cloth. The forward end of the covering 12 is looped around the forward convolution 13 of the coil and is secured thereto as by the stitching 14.

For securing the rear end of the resilient coil 10 and of the covering 12 to the spot light casing which has the peripheral groove 15 at its forward end, the following construction is provided: 16 is a metallic band adapted to engage in the peripheral groove 15 and having the hook or loop portions 17 extending from its forward edge and adapted to embrace the rear convolution 18 of the resilient coil 10. The band 16 is also provided with a series of apertures 19 around its periphery through which suitable stitching 20 may extend for securing the rear of the covering 12 to the band, this rear being return-bent underneath the band. For securing the band 16 in the peripheral groove 15 the former is provided with the upwardly bent ends 21 which are apertured as at 22 for engagement with the bolt 23. This bolt is readily engaged by the nut 24 for pulling the ends of the band toward each other and tightens the band upon the spot light casing.

It will be readily seen that I have provided a simple attachment for preventing the glare or reflection of the light rays striking the windshield interfering with the vision of the driver or other occupants. Furthermore, the construction is such that the light may be adjusted to throw its light rays where desired.

What I claim as my invention is:

1. The combination with a wind shield, of a projector in rear of and facing said wind shield and a casing between said wind shield and projector, and surrounding the light rays passing from said projector to said wind shield.

2. The combination with a wind shield, of a light adjustably facing said wind shield, and a casing yieldably extending between said wind shield and light, and surrounding the light rays passing from said light to said wind shield.

3. The combination with a wind shield, of a spot light facing said wind shield, a resilient coil secured to said spot light and extending adjacent to said wind shield, and a flexible covering surrounding said coil and adapted to surround the rays of light between said spot light and wind shield.

4. The combination with a wind shield, of a light casing facing said wind shield and having a peripheral groove portion at its end nearest to said wind shield, a resilient coil between said wind shield and light casing, a covering upon said coil and a band engaging in said groove portion and secured to said coil and cover.

5. The combination with a wind shield, of a light casing facing said wind shield and having a peripheral groove portion at its front end, an apertured metal band engaging in said groove portion and having hook portions extending from its forward edge, a resilient coil secured in said hook portions and extending adjacent to said wind shield, an opaque covering surrounding said coil and secured to its forward end and means extending through the apertures in said band for securing said covering thereto.

6. The combination with a wind shield, of a spot light in rear of the shield and a casing interposed between the light and shield for preventing the reflection past the light of the light rays striking the shield, said spot light being adjustable in relation to the shield without affecting the control of the light rays by the casing.

7. The combination with a wind shield, of an adjustable spot light in rear of the shield, a guard for preventing the reflection past the spot light of the light rays from the shield, the guard being attached to the spot light and bearing against the shield, the casing remaining in contact with the shield in the different positions of adjustments of the casing.

8. The combination with a wind-shield, of a projector in rear of and facing said windshield and a guard upon said projector for preventing the reflection past the projector of the light rays striking the wind-shield.

In testimony whereof I affix my signature.

EDWARD W. REIBER.